(12) United States Patent
Chi

(10) Patent No.: US 6,822,779 B2
(45) Date of Patent: Nov. 23, 2004

(54) METHOD OF FINDING DRIVE VALUES FOR AN ACTUATION MECHANISM

(75) Inventor: Robert Chih-Jen Chi, Thousand Oaks, CA (US)

(73) Assignee: NP Photonics Inc., Tucson, AZ (US)

( * ) Notice: Subject to any disclaimer, the term of this patent is extended or adjusted under 35 U.S.C. 154(b) by 220 days.

(21) Appl. No.: 10/292,467

(22) Filed: Nov. 13, 2002

(65) Prior Publication Data

US 2004/0090141 A1 May 13, 2004

(51) Int. Cl.⁷ .................. G02B 26/00; G02B 26/02; G02F 1/07; G01B 9/02; H01S 3/10
(52) U.S. Cl. ............. 359/290; 359/291; 359/295; 359/230; 359/224; 359/872; 359/260; 359/578; 356/519; 372/20
(58) Field of Search .................. 359/290, 291, 359/295, 224, 230, 872, 578, 260, 198, 298, 293; 356/519; 372/20, 32, 50; 310/309; 385/12

(56) References Cited

U.S. PATENT DOCUMENTS

| | | | | |
|---|---|---|---|---|
| 5,414,565 A | * | 5/1995 | Sullivan et al. | 359/872 |
| 6,549,687 B1 | * | 4/2003 | Kochergin et al. | 385/12 |
| 6,594,059 B2 | * | 7/2003 | Flanders | 359/230 |
| 6,597,461 B1 | * | 7/2003 | Verma et al. | 356/519 |
| 6,665,109 B2 | * | 12/2003 | Little et al. | 359/290 |
| 6,721,098 B2 | * | 4/2004 | Atia | 359/578 |
| 6,735,004 B1 | * | 5/2004 | Hagelin et al. | 359/198 |
| 6,747,775 B2 | * | 6/2004 | Little | 359/238 |

* cited by examiner

Primary Examiner—Loha Ben
(74) Attorney, Agent, or Firm—Fleshner & Kim, LLP

(57) ABSTRACT

A method of finding drive values for an actuation mechanism having three degrees of freedom is provided, that will optimize a predetermined parameter of a system that utilizes the actuation mechanism. In one embodiment, a method of finding drive values for a tunable Fabry-Perot cavity is provided, for driving three independently adjustable actuators such that the cavity mirrors of the tunable Fabry-Perot cavity are maintained in a substantially parallel relationship.

27 Claims, 11 Drawing Sheets

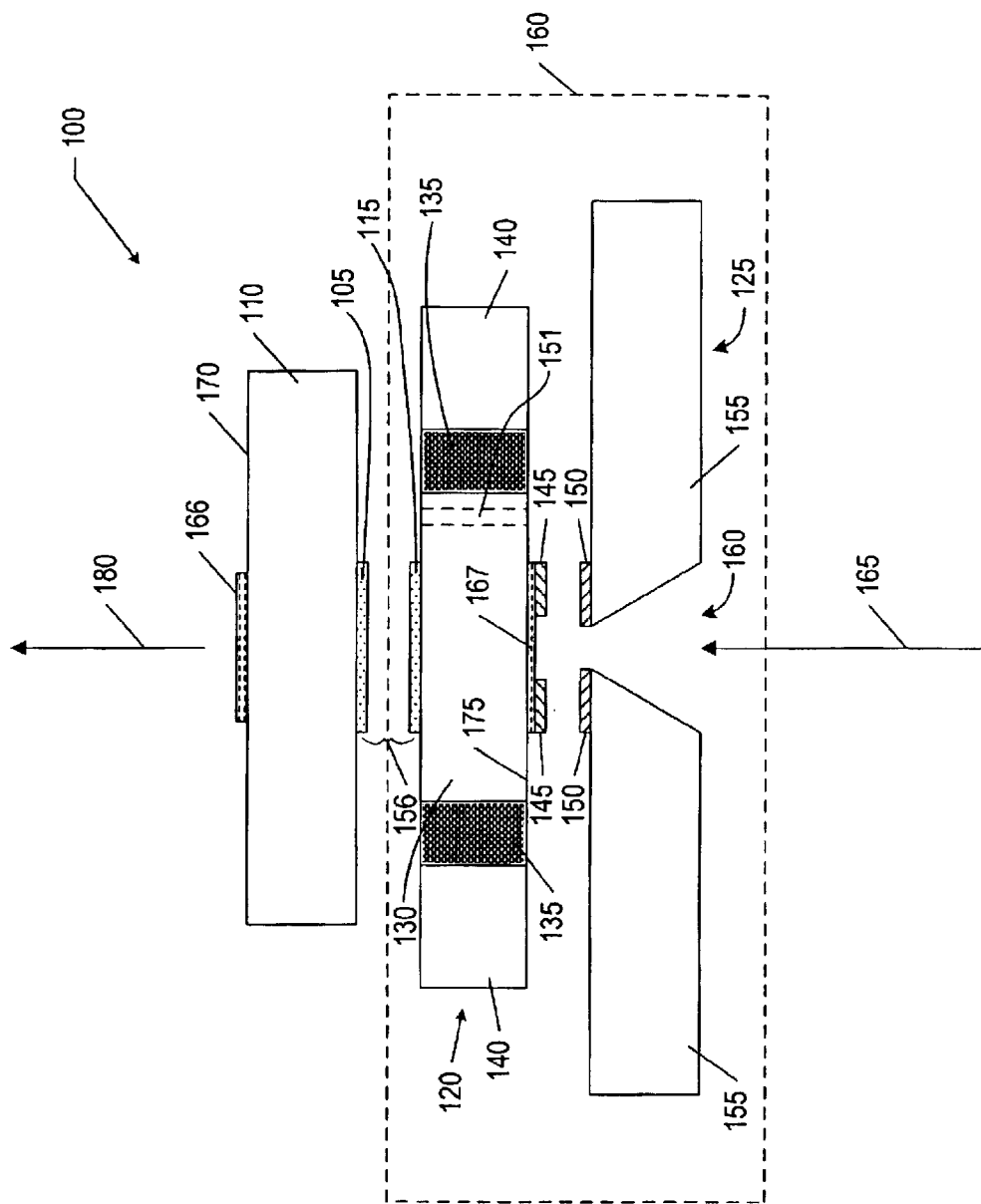

METHOD OF FINDING DRIVE VALUES FOR AN ACTUATION MECHANISM

BACKGROUND OF THE INVENTION

1. Field of the Invention

This invention relates to actuation mechanisms and, more particularly, to a method of finding drive values for such an actuation mechanism.

2. Background of the Related Art

In certain actuation mechanisms that exhibit multiple degrees of freedom, it may be necessary to determine drive values that will optimize a predetermined parameter of a system that utilizes the actuation mechanism. For example, in a tunable Fabry-Perot filter, it is desirable to maintain the mirrors of the resonant cavity in the Fabry-Perot filter in a parallel relationship. If the movable mirror in the tunable Fabry-Perot filter can be actuated along multiple axes, it is necessary to determine the drive values that will maintain the mirrors in a parallel relationship. Accordingly, there is a continuing need for methods for driving actuation mechanisms having multiple degrees of freedom, such that a predetermined parameter can be optimized.

SUMMARY OF THE INVENTION

An object of the invention is to solve at least the above problems and/or disadvantages and to provide at least the advantages described hereinafter.

The present invention provides a method of finding drive values for an actuation mechanism having three degrees of freedom, that will optimize a predetermined parameter of a system that utilizes the actuation mechanism.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 1A and 1B are cross-sectional views of the tunable Fabry-Perot filter 100, in accordance with the present invention;

DETAILED DESCRIPTION OF PREFERRED EMBODIMENTS

The present invention provides a method of finding drive values for an actuation mechanism, that will optimize a predetermined parameter of a system that utilizes the actuation mechanism. The present invention is particularly applicable to maintaining parallelism between the cavity mirrors of a tunable (actuated) Fabry-Perot filter, such as, for example, the tunable Fabry-Perot filter described in co-pending related International (PCT) Patent Application No. PCT/US02/12496, which is herein incorporated by reference in its entirety.

Figure 1B:
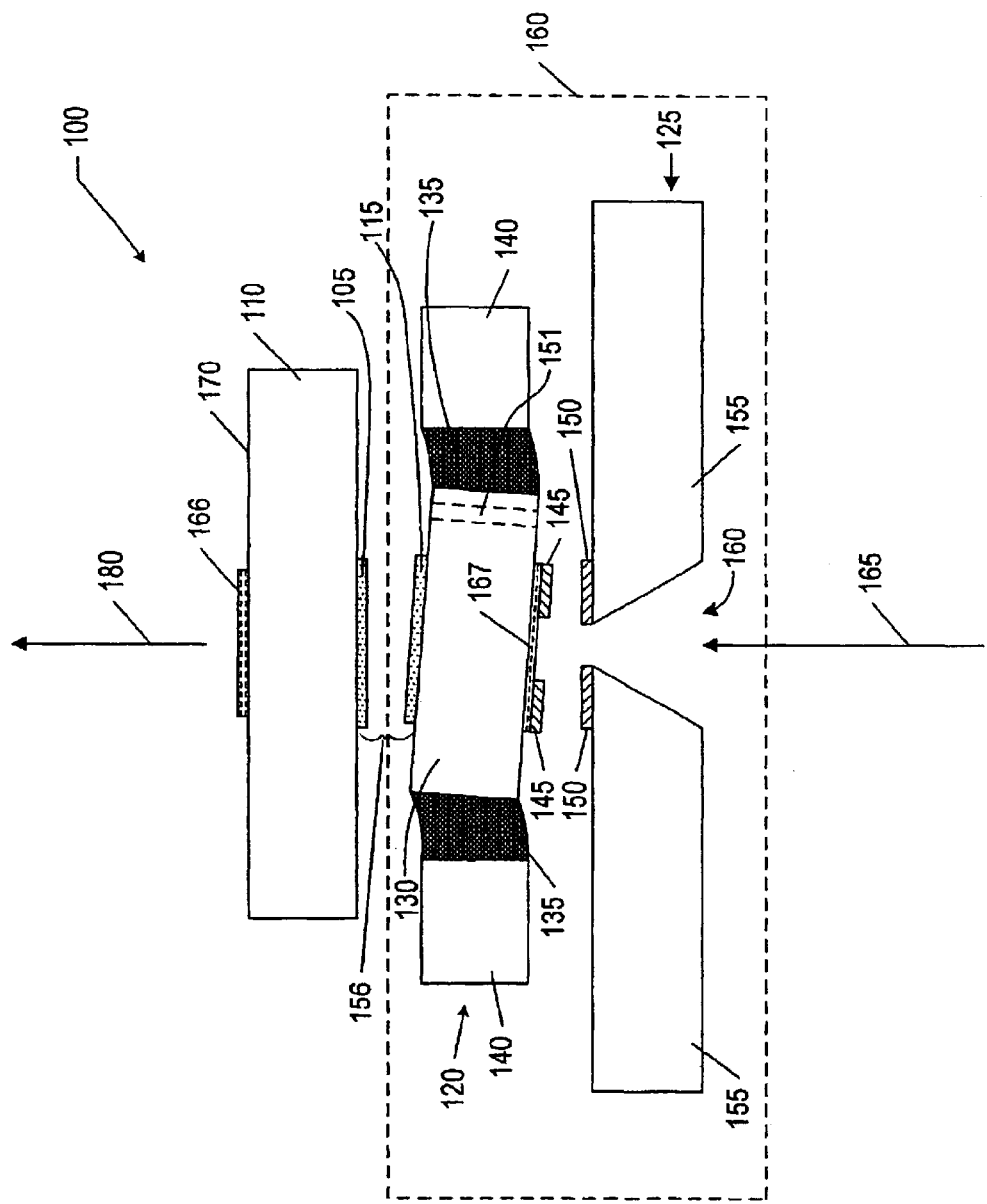

FIGS. 1A and 1B are cross-sectional views of the tunable Fabry-Perot filter 100, described in PCT Application No. PCT/US02/12496. The tunable Fabry-Perot filter 100 includes a first mirror 105 supported by a mirror support 110, a second mirror 115 supported by a compliant mechanism 120, and an actuator support 125. The compliant mechanism 120 includes an island 130 that is surrounded by and connected to a compliant member 135. The compliant member 135 is surrounded by and connected to a frame 140.

The island 130 is preferably formed from a material that is more rigid than the compliant material 135, and preferably has a higher Young's modulus than the compliant member 135. Compliant member 135 is preferably an elastic material with a relatively small Young's modulus, and a relatively high elastic limit, such as elastomer. The frame 140 is preferably formed from a rigid lightweight material, which may be the same material used for the island 130. In a preferred embodiment, the compliant member is substantially circular and substantially uniform in height and width around the circle to maximize uniformity of the restoring force on the island 130 provided by the compliant member 135.

A first set of electrodes 145 is disposed on the island 130 on a side of the island 130 opposite the second mirror 115. The actuator support 125 includes a second set of electrodes 150 disposed on an actuator frame 155. The electrodes can be formed from any type of conductive material such as gold, silver, aluminum, or copper, as well carbon and conductive polymers or oxides. Additionally, transparent conductors may be used, while still falling within the scope of the present invention.

The compliant mechanism 120 and the actuator support 125 together form an actuated mechanism 160, which is described in detail in co-pending related U.S. application Ser. No. 10/085,143, filed Mar. 1, 2002, now U.S. Pat. No. 6,665,109 which is herein incorporated by reference in its entirety.

The first and second mirrors 105 and 115 are preferably highly reflective dielectric coatings, and are positioned to form the resonant cavity 156 of the tunable Fabry-Perot filter 100. The mirrors may also be formed from fully or partially reflective metal coatings, while still falling within the scope of the present invention. The actuator frame 155, and first and second sets of electrodes 145 and 150 preferably contain openings 160 for allowing input light 165 to be coupled into the resonant cavity 156 of the tunable Fabry-Perot filter 100. Alternatively, the actuator frame 155 and electrodes 145 and 150 can be made of a material that is substantially transparent to the input light 165 to obviate the need of openings 160. Anti-reflection (AR) coatings 166 and 167 are preferably disposed on surfaces 170 and 175 of the mirror support 110 and island 130.

The electrodes 145 and 150 are configured to receive and/or transmit voltage signals to electronic circuits external to the tunable Fabry-Perot filter 100. In operation, command signals from a controller (not shown) are applied to the first and second sets of electrodes 145 and 150 which generate an electrostatic force that moves the island 130, and therefore the second mirror 115. In this way, the spacing of the resonant cavity 156, and thereby the frequency of the output light signal 180, can be adjusted. The compliant member 130 exerts a restoring force to the island 130, which tends to urge the island 130 back into alignment with the frame 140 when the electrostatic force is removed.

An important parameter affecting the performance of a Fabry-Perot filter is how parallel the first and second mirrors 110 and 115 are with respect to each other. This parameter is sometimes referred to as the "tilt offset" or "tilt error". Tilt offset can arise, for example, from certain environmental factors, such as vibrations transmitted through the atmosphere, and vibrations transmitted through the substrate onto which the tunable Fabry-Perot filter 100 is mounted. Other environmental influences which can alter the spacing between the first mirror 105 and the second mirror 115 include changing the orientation of the tunable Fabry-Perot filter 100 relative to the earth's gravitational field. Such changes in orientation can cause the island 130 to displace at different distances and angles relative to the mirror support 110.

Figure 2B:
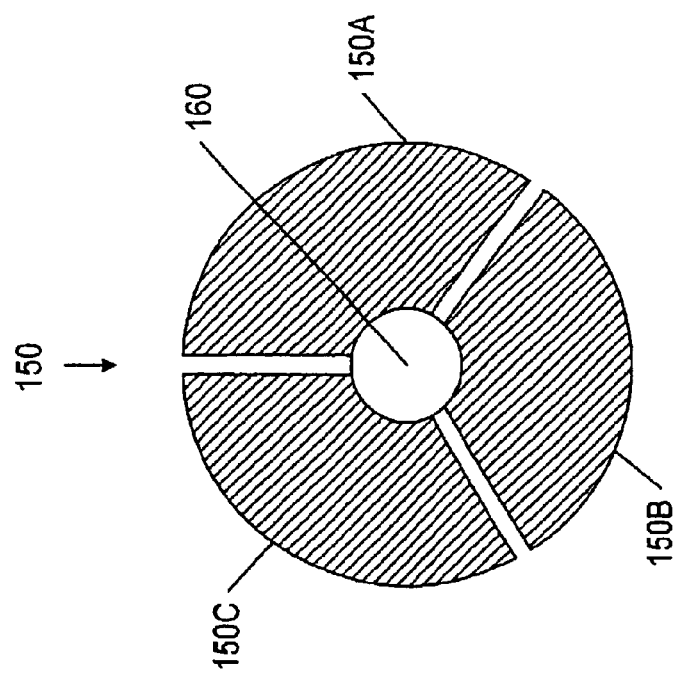
FIGS. 2A and 2B are plan views of one preferred embodiment of first and second sets of electrodes used in the tunable Fabry-Perot filter of FIGS. 1A and 1B.
Figure 2A:
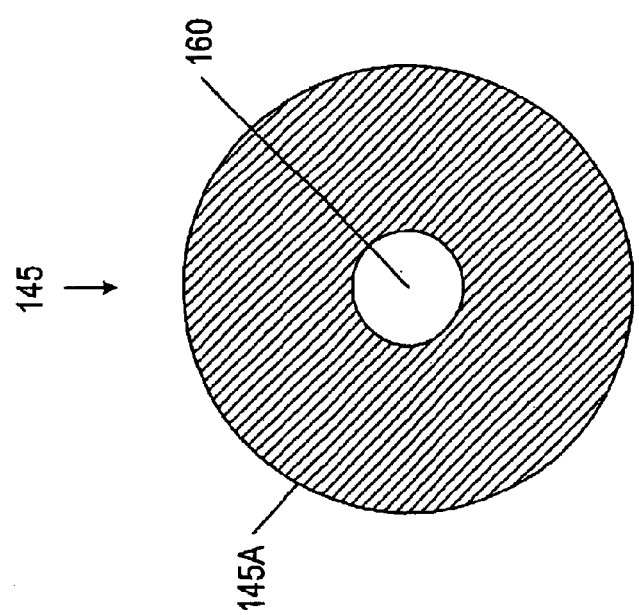

The first and second sets of electrodes 145 and 150 are preferably configured to allow a tilting force to be applied to the island 130, in order to fine tune the Fabry-Perot cavity 156. FIGS. 2A and 2B are plan views of one preferred embodiment of the first and second sets of electrodes 145 and 150, respectively. In this embodiment, three electrodes 150A–150C make up the second set of electrodes 150, and a single common electrode 145A is used for the first set of electrodes 145. It should be appreciated that this arrangement could be reversed, so that the three electrodes 150A–150C could be placed on the island 130, while the common electrode 145A is placed on the actuator support 125. In addition, the common electrode could be subdivided into three electrodes. Numerous variations are within the scope of the invention.

As discussed above, first and second sets of electrodes 145 and 150 are configured to generate an electrostatic force when a command signal (voltage) is applied thereto. The command signal can be configured to create a repulsive or an attractive electrostatic force between the electrodes. However an attractive electrostatic force is the preferred mode of operation. Other possibilities for providing force are possible and still fall within the scope of the invention. Possibilities include but not limited to electromagnetic force and piezoelectric force.

Up and down motion of the island 130, and therefore the spacing of the resonant cavity 156, can be controlled by applying a voltage between the three electrodes 150A–150C and the counterelectrode 145A. The finesse and other operating parameters of the Fabry-Perot filter is dependent on the tilt offset between the first and second mirrors 105 and 110. It should be understood that the finesse of the tunable Fabry-Perot filters 100 is also dependent on other factors such as the reflectivity of the mirrors 105 and 110. The three-electrode structure shown in FIG. 2B for the second set of electrodes 150, in combination with the common electrode 145A, form an actuation mechanism that exhibits three degrees of freedom. This actuation mechanism allows for control of the tilt of the island 130, and therefore the second mirror 115, with respect to the first mirror 105. This is accomplished by selectively applying a stronger or weaker voltage to one or more of the three electrodes 150A–150C.

The present invention provides a method to optimize the parallelism of two surfaces as they are displaced relative to each other. This is accomplished by a novel method of translating a first surface while holding the angle of tilt of that surface, relative to a second surface, substantially constant. Adaptively maintaining a constant tilt of the first surface while it is being displaced requires: (1) that forces be applied from at least three points, preferably widely separated over the surface; and (2) that each of the forces be independently adjusted to compensate for inevitable asymmetries in the response of the assembly. These asymmetries can arise from several sources, including, but not limited to, misalignment of the center lines of the two plates, unequal electrode areas or non-uniformities in the stiffness of the suspension system constraining the first surface.

It is desirable to be able to find the unique set of three forces capable of changing the gap between the two surfaces, while maintaining the tilt of the first surface in a fixed relationship (e.g., parallel) to the second surface. It is highly undesirable and tedious to experimentally map out the displacement as a function of the forces to determine the unique set of force triplets that corresponds to constant (e.g., zero) relative tilt between the two surfaces.

Figure 2C:
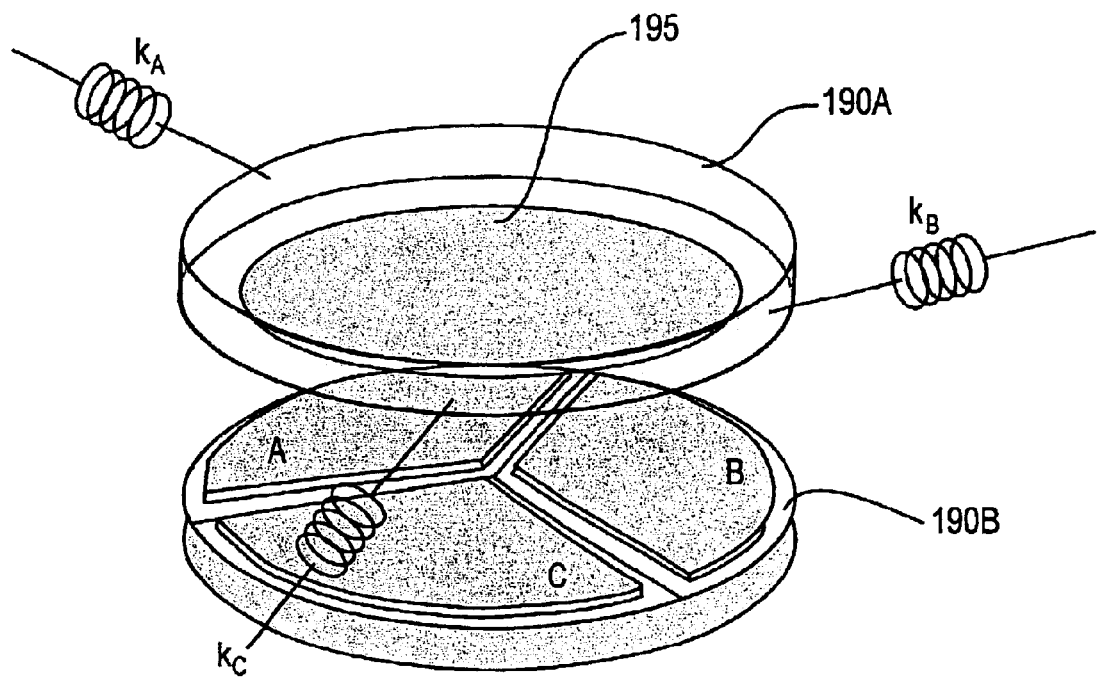
FIG. 2C is a schematic view of a generalized actuated compliant mechanism, in accordance with the present invention.

The method of the present invention can be generally described by referring to FIG. 2C, which is a schematic view of a generalized actuated compliant mechanism. In the system shown in FIG. 2C, two plates 190A and 190B are nominally parallel to each other, with a gap separating them. The upper plate 190A is held in place with a suspension system capable of spring-like behavior, as represented by the three spring constants $k_A$, $k_B$, and $k_C$.

The lower plate 190B is mounted rigidly and is non-movable. The desired effect is to move the upper plate 190A closer to or further away from the lower plate 190B, while maintaining the relative tilt of the plates. One of the plates, e.g., the upper plate 190A, contains a common electrode 195, while the opposing lower plate 190B contains three symmetrically placed drive electrodes represented by A, B and C. Each of the three symmetrically placed drive electrodes are electrically independent of the other. These drive electrodes are used to provide three displaced electrostatic forces.

The three spring constants $k_A$, $k_B$, and $k_C$ are used to represent the suspension system. Any suspension system, even one of arbitrary shape, can be modeled as three symmetrically spaced independent springs with different spring constants. For small displacements and small tilt angles, the following analysis valid.

The electrostatic force of each electrode segment pulling against the common electrode that is rigidly affixed to the upper plate 190A is $$F_i = \frac{\varepsilon A_i V_i^2}{2(d_i - x_i)^2} \quad i = A, B, C \tag{1}$$

The restoring force provided by the suspension system is $$F_i = k_i x_i \, i = A, B, C \tag{2}$$

In equilibrium, these two are equal, $$k_i x_i = \frac{\varepsilon A_i V_i^2}{2(d_i - x_i)^2} \quad i = A, B, C \tag{3}$$

Taking $x_i = x_{i0} + x$ and rearranging Equation (3), $$V_i^2 = \frac{2k_i}{\varepsilon A}[x^3 + (3x_{i0} - 2d_i)x^2 + (d_i - x_{i0})(d_i - 3x_{i0})x + (d_i - x_{i0})^2 x_{i0}] \tag{4}$$

The $x^3$ term in equation (4) can be ignored if, $x << 2d_i - 3x_{i0}$, If we also assume that $d_i - x_{i0} \approx d - x_0$, and $d_i >> x_{i0}$, then $$V_i^2 \approx V_{i0}^2 + P(x)D_i \tag{5a}$$

where: $V_{i0}^2 = (2k_i/\Box A_i)(d_i - x_{i0})^2(x_{i0})$, $D_i = 2k_i/\Box A_i$ and $P(x) \approx [-2(d-x_0)x^2 + (d-x_0)^2 x]$.

Equation (5) is the equation of a straight line in $V^2$ space.

Since $\Delta\lambda = \lambda - \lambda_o$ and $\Delta\lambda \propto X$ in a tunable filter, an approximation of the tunable filter peak wavelength to the applied voltage relationship can be approximated by $$V_i^2 \approx V_{io}^2 + P(k\Delta\lambda)D_i = V_{io}^2 + [-2(d-x_o)k^2\Delta\lambda^2 + (d-x_o)^2 k\Delta\lambda],$$

Or have the approximate form:

$$V_i^2 = a\lambda^2 + b\lambda + c, \tag{5b}$$

where a, b and c are constants

The method developed herein takes advantage of this linear relationship to find all force triplets that can be used to move one surface with respect to the other while maintaining a fixed tilt relationship between the two. Only a few (e.g., 2 to 5) experimental data sets are required with this method, where each data set is the voltage triplet for a displacement such that the surfaces maintain their fixed tilt relationship. The method can e used to interpolate and find all acceptable voltage triplets.

In one further embodiment of the present method, if one provides a third surface that is in a known tilt relationship with respect to one of the two surfaces (plates) described above, then one can use the method of the present invention to maintain the tilt relationship between the third surface and the second surface. For example, if the lower plate 190B, described above, is nearly parallel to an upper (third) surface with a tilt offset of x degrees, then the present method can be used to move the second surface (e.g., the upper plate 190A) in the system to also be at x degrees offset from the lower surface (e.g., the lower plate 190B), and maintain such tilt offset during movement of the second surface. Since both the second and third surfaces are tilted at x degrees, they are parallel to one another.

An example of such a three surface system is the tunable Fabry-Perot filter 100 of FIG. 1. In the tunable Fabry-Perot filter of FIG. 1, the actuator supporter 125 corresponds to the lower plate 190B of FIG. 2C, the compliant mechanism 120 corresponds to the upper plate 190A of FIG. 2C, and the mirror support 110 corresponds to the third surface described above.

The tilt offset preferably is controlled as the tunable Fabry-Perot filter 100 is tuned, or scanned, to different wavelengths. The method of the present invention is used for determining the voltages to apply to each of the three electrodes 150A–150B that will adjust the spacing of the resonant cavity 156 to a desired wavelength while maintaining a desired degree of parallelism between the mirrors 105 and 115.

In order to determine the drive voltages required for any wavelength in the tunable Fabry-Perot's tuning range, a reference optical signal, preferably a broadband signal, is sent into the tunable Fabry-Perot 100 as the input light 165, and the power of the output signal 180 is monitored, preferably with a photodiode (not shown). When the first and second mirrors 105 and 115 are parallel, the power of the output signal 180 is maximized. As the tilt offset increases, the power of the output signal 180 decreases. Given this relationship between tilt offset and output power, a method of determining the drive voltages required for each of the electrodes 150A–150C will now be described.

As discussed above, a three-electrode structure is used as the actuation mechanism in the tunable Fabry-Perot filter 100. It should be appreciated that, with the three electrodes 150A–150C on the actuator support 125, there are three corresponding points on the single common electrode 145A where the electrostatic force is "centered". Accordingly, one can view the single common electrode 145A on the island 130 as comprising three "virtual" electrodes.

Applying the analysis discussed above to the tunable Fabry-Perot filter 100 of FIG. 1, the electrostatic force generated when a voltage is applied to one of the electrodes 150A–150C is generally defined by the following formula:

$$F = \varepsilon A V_x^2/2(S - \Delta x)^2, \tag{6}$$

where $\varepsilon$ is the permittivity of the volume between the electrodes, A is the area the covered by each electrode, S is the initial spacing between the electrodes (with no voltage applied), $\Delta x$ is the displacement of the electrode 145A on the island 130, and $V_x$ is the voltage between the electrodes.

The restoring force generated by the compliant member 135 is preferably defined by the equation for a linear spring:

$$F = k\Delta x \tag{7}$$

Accordingly, $$k\Delta x = \varepsilon A \, V_x^2/2(S - \Delta x)^2 \tag{8}$$

One can see that when S is significantly greater than $\Delta x$, the denominator of equation (3) is dominated by S, and the displacement $\Delta x$ is approximately linearly proportional to $V_x^2$. As a practical matter, if the displacement $\Delta x$ is greater than or equal to approximately S/3, the electrostatic force will exceed the restoring force provided by the compliant member 135, and the electrode 145A on the island 130 will exhibit "snap down" and contact the opposing electrode (150A, 150B or 150C) on the actuator support 125. Accordingly, the displacement $\Delta x$ must necessarily be lower than approximately S/3 in such a device. In the preferred embodiment, S is approximately 5 $\mu$m, and $\Delta x$ is preferably less than or equal to approximately S/5 throughout the desired operating range of the device.

Generally, when no voltage is applied to the electrodes, the mirrors 105 and 115 will not be parallel due to various tilt offsets that result from the manufacturing process. Accordingly, some voltage is needed on the drive electrodes to bring the mirrors 105 and 115 into a parallel relationship.

Once the mirrors 105 and 115 are brought into a parallel relationship, mirror 105 on the island 130 is displaced along an axis normal to the face of the mirror 105 in order to scan the tunable Fabry-Perot filter 100 between different resonant wavelengths. If the parallelism between the mirrors 105 and 115 is maintained during movement of the mirror 105, there is negligible rotation of the "virtual" electrodes relative to each other as the mirror 105 is moved back and forth along such axis. Such parallel operation is hereinafter referred to for convenience as a "Parallel Scan".

Figure 3:
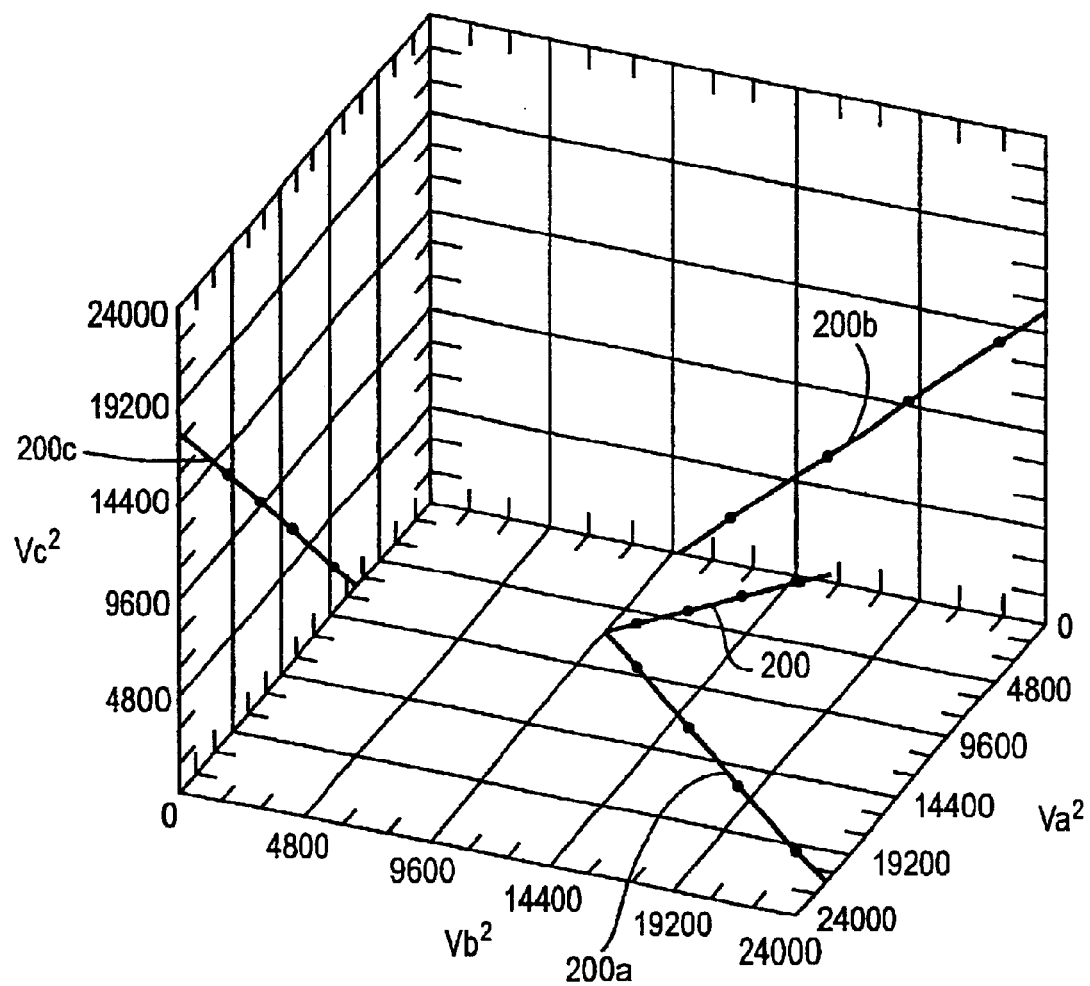
FIG. 3 is a three-dimensional plot of a hypothetical Operating Line in $V^2$ Space, in accordance with the present invention.

An aspect of the present invention is the use of the approximation that, for small Δx and Parallel Scan operation, if each of the three drive voltages $V_A$, $V_B$ and $V_C$ applied to the three electrodes 150A, 150B and 150C, respectively, is mapped as an axis in 3-D space as the square of the voltage ($V_A^2$, $V_B^2$, $V_C^2$), then, for operation along the Operating Line, the result in such "$V^2$ Space" is approximately a straight line going from a lower voltage to a higher voltage along each axis. This is shown graphically in FIG. 3, which is a three-dimensional plot of a hypothetical Operating Line 200 in "$V^2$ Space", with $V_A^2$ plotted along the x-axis, $V_B^2$ plotted along the y-axis and $V_C^2$ plotted along the z-axis. The projections of the Operating Line 200 along the x-y plane ($V_B^2$-$V_A^2$ plane), x-z plane ($V_A^2$-$V_C^2$ plane) and y-z plane ($V_B^2$-$V_C^2$ plane) are shown as lines 200a, 200b and 200c, respectively.

The Operating Line 200 can be located and defined by finding any two points on the Operating Line 200, and then calculating the remainder of the Operating Line 200. Once the Operating Line 200 is found, one can operate the tunable Fabry-Perot filter 100 along this line (i.e., the relative voltages applied to electrodes 150A–150C are maintained as dictated by the values defined by the Operating Line 200), and the mirrors 105 and 115 will be maintained in a substantially parallel relationship.

Figure 4A:
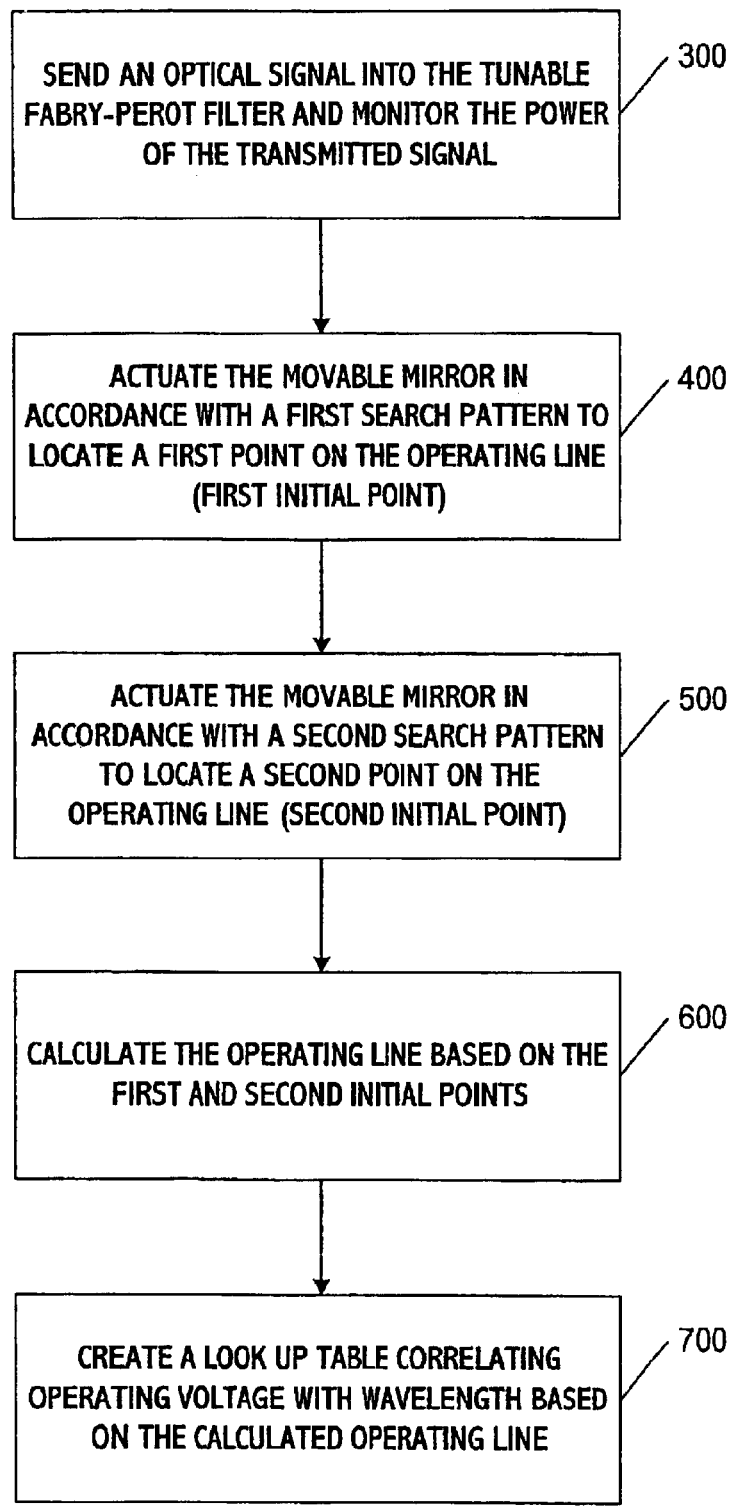
FIG. 4A is a flowchart of a first preferred method for locating an Operating Line in $V^2$ Space, in accordance with the present invention.

FIG. 4A is a flowchart of a first preferred method for locating the Operating Line 200. The method starts at step 300, where an optical signal is sent into the tunable Fabry-Perot filter 100, and the power of the transmitted signal is monitored. The optical signal is preferably from a broadband optical source (i.e., a relatively uniform input power over the operating spectrum of the tunable Fabry-Perot filter 100).

Next, at step 400, the movable mirror 105 is actuated by applying voltages to the three drive electrodes 150A–150C in accordance with a first search pattern, in order to locate a first point on the Operating Line 200 (hereinafter "First Initial Point"). When first and second mirrors 105 and 115 are parallel (i.e., the voltages $V_A^2$, $V_B^2$, $V_C^2$ applied to the electrodes 150A–150C, respectively, fall on the Operating Line 200), the power of the transmitted signal is maximized. As the tilt offset increases, the power of the transmitted signal decreases. Accordingly, the First Initial Point on the Operating Line 200 is located by monitoring the power of the transmitted optical signal as the movable mirror 105 is moved, in accordance with the first search pattern.

Next, at step 500, the movable mirror 105 is actuated in accordance with a second search pattern to locate a second point on the Operating Line 200 (hereinafter "Second Initial Point"). Once the Second Initial Point on the Operating Line 200 is located, the remainder of the Operating Line 200 is calculated, at step 600, based on the First and Second Initial Points.

At step 700, a look-up table is created that correlates the voltages applied to the electrodes 150A–150C to the wavelength transmitted by the tunable Fabry-Perot filter. The Operating Line 200 provides the relative electrode voltages to apply to electrodes 150A–150C to maintain parallelism across all wavelengths of interest (which defines a directional vector in $V^2$ Space). However, one still needs to know where along the Operating Line 200 one needs to be to tune the tunable Fabry-Perot filter 100 to a desired wavelength.

Since the directional vector has been defined (the Operating Line 200), you then can define the following equation:

$$V_A^2 = V_{(0)A}^2 + pX_A, \qquad (9)$$

where $X_A$ is the directional vector along the $V_A^2$ axis in $V^2$ Space.

One only needs to determine the function "p", since the initial voltages at the starting point are known. "p" is a function of wavelength. Since the directional vector is known, "p" is identical in these equations:

$$V_A^2 = V_{(0)A}^2 + pX_A \qquad (10)$$

$$V_B^2 = V_{(0)B}^2 + pX_B \qquad (11)$$

$$V_C^2 = V_{(0)C}^2 + pX_C \qquad (12)$$

In order to solve for the function "p", an optical signal from calibration optical source is sent into the tunable Fabry-Perot filter 100. The optical signal preferably contains at least three distinct wavelength lines that lie within the wavelength band of interest. Thus, the optical calibration source can be at least three separate lasers that each emit one of the at least three wavelength lines, a broadband source used in combination with an ITU filter that passes the wavelength lines of interest, or any other source that can generate at least three wavelength lines that lie within the wavelength band of interest.

The tunable Fabry-Perot is then scanned along the Operating Line 200, until the wavelength lines in the optical signal are found. The relative voltages at each wavelength line is a point along the Operating Line 200. If three points are found (which correspond to three wavelength lines), these three points can be used to solve p as a second-order polynomial function of wavelength that is a good approximation of the function "p" along the Operating Line 200.

This second order polynomial function approximation properties can be seen from Equation (5b): $V_i^2 = a\lambda^2 + b\lambda + c$ for i=A, B, C . . . By using at least three points of known voltage and wavelength, constants a, b, c can be found, which yield a very good approximation and establish a completed relationship of driving voltages to peak wavelength calibration.

Once the function "p" is approximated, the look-up table can be created. Once the look-up table is created, the tunable Fabry-Perot filter 100 can be tuned to a desired wavelength by driving the electrodes 150A–150C with the voltages indicated in the look-up table. By using the voltage values in the look-up table, the movable mirror 105 will be displaced along the Operating Line 200, thus maintaining parallism with the second mirror 115.

Figure 4B:
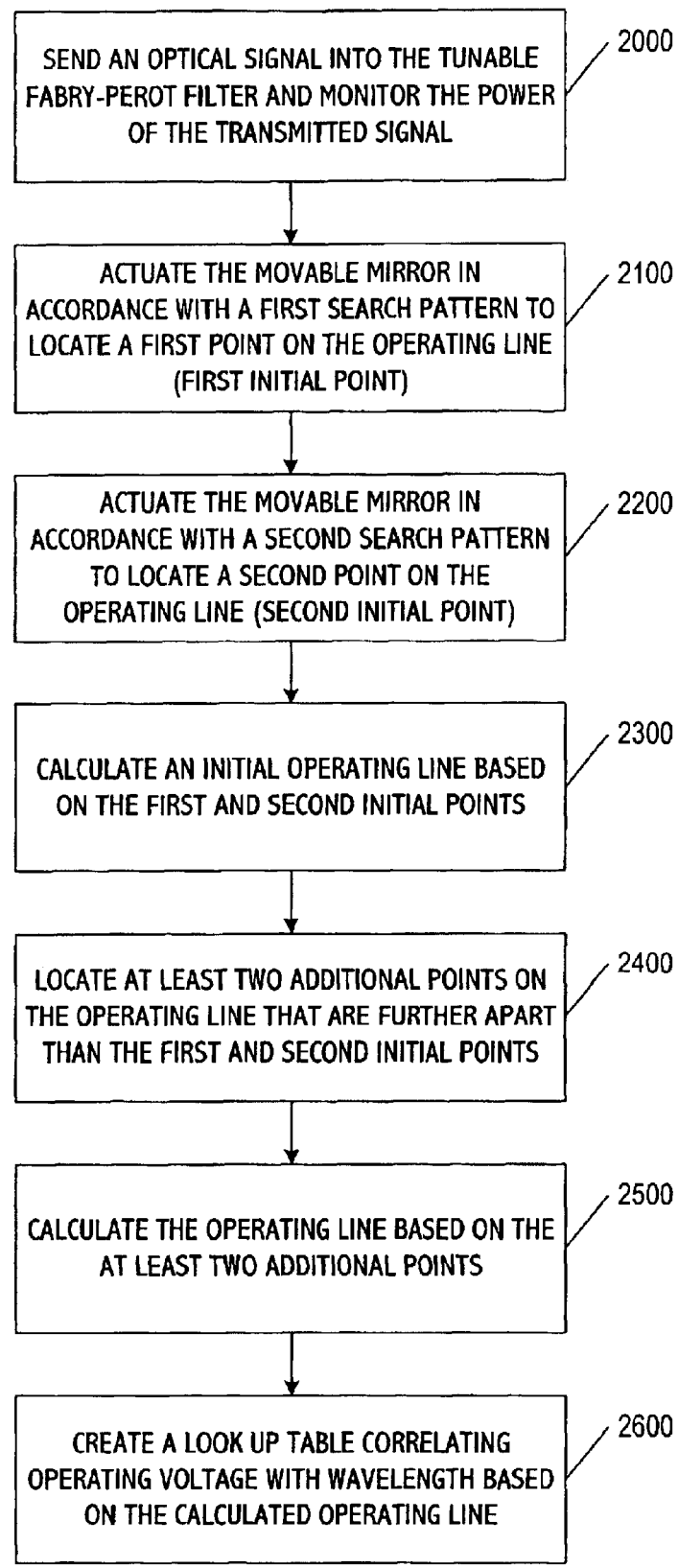
FIG. 4B is a flowchart of a second preferred method for locating an Operating Line in $V^2$ Space, in accordance with the present invention.

It is possible that the First and Second Initial points located in steps 400 and 500 are too close together to yield an accurate approximation of the Operating Line 200. FIG. 4B is a flowchart of a second preferred method for locating the Operating Line 200, in which additional points are located on the Operating Line 200 in order to obtain a closer approximation of the Operating Line 200.

Steps 2000, 2100 and 2200 are identical to steps 300, 400 and 500, respectively, in the FIG. 4A method.

At step 2300, an Initial Operating Line is calculated based on the First and Second Initial Points. Then, at step 2400, at least two additional points on the Operating Line 200 that are further apart than the First and Second Initial Points are located. In a preferred embodiment described below, the location of the additional points is found utilizing a spiral search technique.

Next, at step 2500, the Operating Line 200 is calculated based on the additional points located at step 2400. Once the Operating Line 200 is calculated, a look-up table is created in the same manner described above in connection with the method of FIG. 4A.

Figure 5:
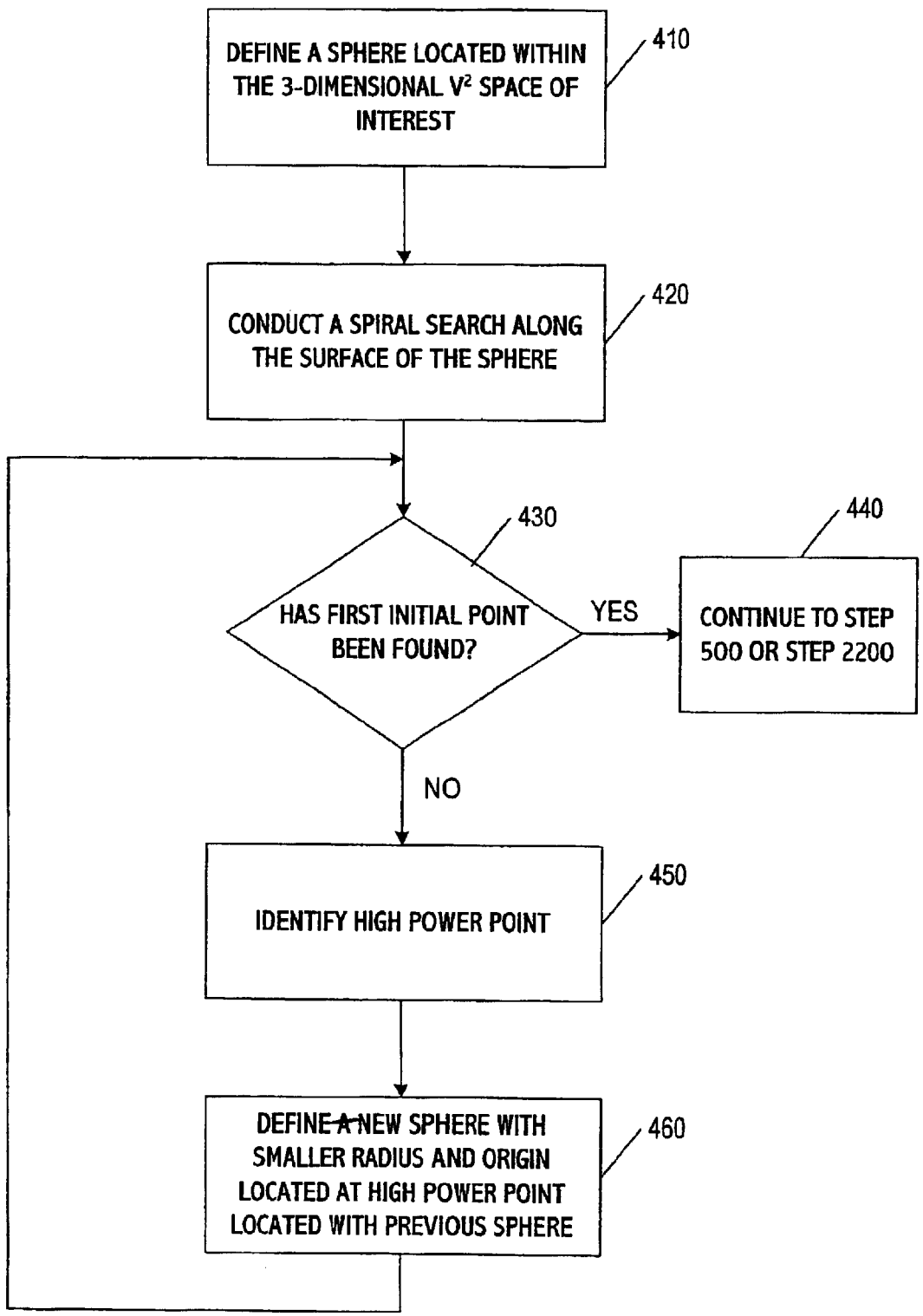
FIG. 5 is a flowchart of a preferred method for locating a First Initial Point on the Operating Line, in accordance with the present invention.
Figure 6:
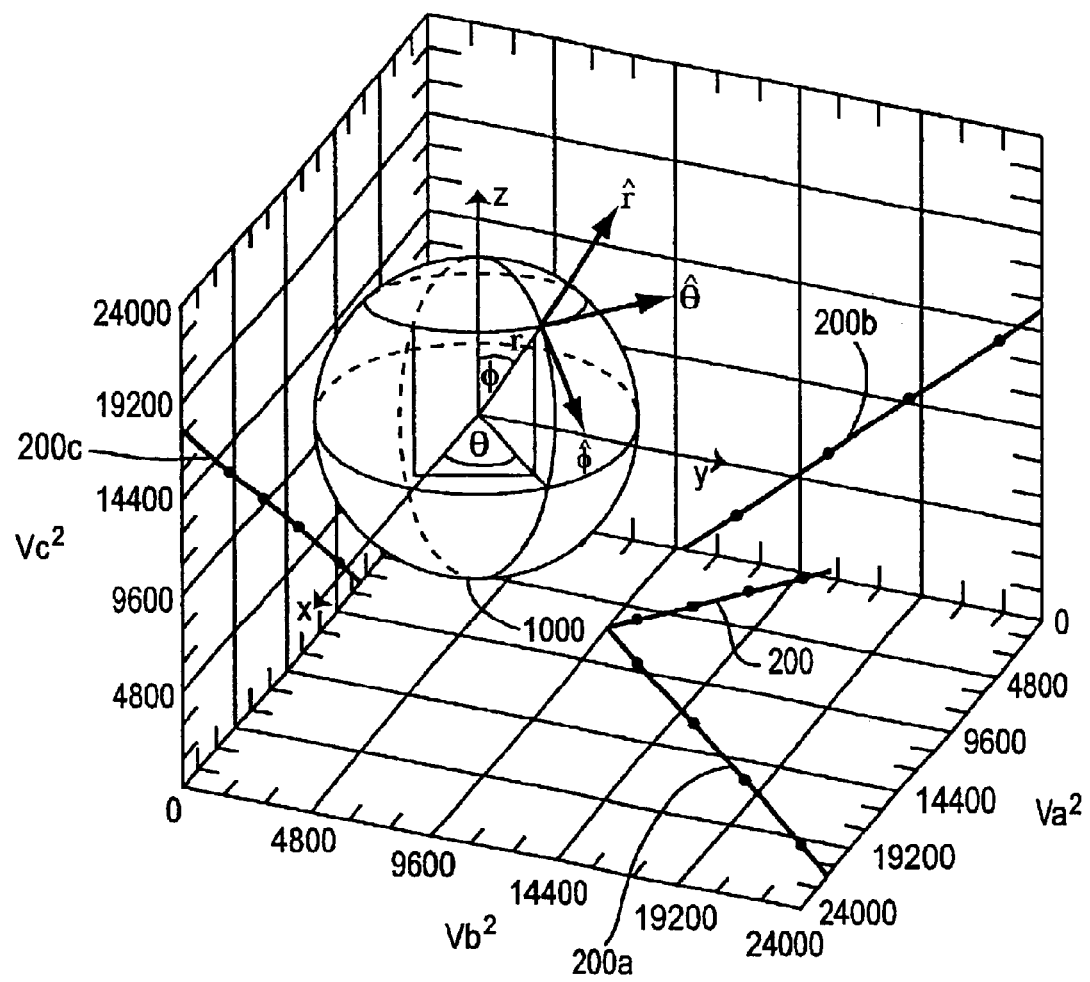
FIG. 6 is a three-dimensional plot showing a sphere located within $V^2$ Space, in accordance with the present invention.

FIG. 5 is a flowchart showing steps in a preferred method for locating the First Initial Point on the Operating Line 200 (step 400 in FIG. 4A and step 2100 in FIG. 4B). The method starts at step 410, in which a sphere is defined that is located within the three-dimensional $V^2$ Space of interest, as shown in FIG. 6.

The $V^2$ Space of interest begins at the origin (0, 0, 0) and ends at the voltages at which operation begins to deviate from being a straight line. In the example shown in FIG. 6, the maximum voltages for $V_A^2$, $V_B^2$ and $V_A^2$ are each 24,000.

In an "ideal" symmetric device, the Operating Line 200 will fall on the diagonal of the $V^2$ Space starting at the origin. However, in practice the Operating Line 200 can fall anywhere within the $V^2$ Space, but will increase along all three axes. Finding the First Initial Point on the Operating Line 200, therefore, is a matter of trial and error that is done by operating the tunable Fabry-Perot filter 100 and determining whether you are operating on or near the Operating Line 200.

Referring back to FIG. 5, at step 420 a spiral search is conducted along the surface of the sphere 1000. Each point along the surface of the sphere 1000 represents voltages $V_A^2$, $V_B^2$ and $V_C^2$ that are used to drive electrodes 150A–150C, respectively. Thus, when the spiral search moves to another point on the sphere 1000, the electrodes 150A–150C are driven by the voltages that define that point on the sphere 1000, and the transmitted optical power is recorded.

The spiral search is started at a zenith point (R, 0, 0) in the spherical coordinate system (r, θ, φ). The spiral search proceeds by holding R constant, and increasing θ to π, while φ circles around from 0 to 2πx (where x is the number of rotations around the sphere 1000). A complete spherical spiral would end at φ=π, but a smaller portion of the sphere can be search around the zenith by ending at a lesser angle. The transmitted optical power is measured at each point.

The number of points measured during the spiral search is determined by the how much one increments θ and φ between points (i.e., Δθ and Δφ), as well as the maximum θ used during the spiral search. The smaller Δθ and Δφ are, the more measurement points you have for each spiral search. Choosing Δθ and Δφ values involve a tradeoff between accuracy and speed. In a preferred embodiment, Δθ is preferably less than π/3, and Δφ is preferably less than π/3. However, any values of Δθ and Δφ can be used while still falling within the scope of the present invention.

One needs to choose an initial location of the origin of the sphere 1000 in $V^2$ Space, as well as an initial radius R prior to initiating the spiral search. One preferred approach is to center the origin of the initial sphere 1000 within the $V^2$ Space of interest, and use an initial radius $R_0$ of $V_{max}/4$, where $V_{max}$ is the maximum voltage in the $V^2$ Space of interest. This assumes that the Operating Line 200 passes from the origin of $V^2$ Space to the extreme corner of $V^2$ Space. In general, however, the size and position of the initial sphere 1000 can be chosen based on the expected characteristics of the device being manufactured.

Once the spiral search is completed, the method proceeds to step 430, where it is determined whether the First Initial Point has been found. The First Initial Point is found when the differences in the transmitted power at the different measuring points along the sphere 1000 can not be discerned above the inherent noise in the device. If this is the case, the origin of the sphere 1000 is determined to be the First Initial Point, and the method continues to step 440, where control is returned to step 500 of FIG. 4A or step 2200 in FIG. 4B.

If the First Initial Point has not been found, the method proceeds to step 450, where the point on the sphere 1000 that generated the highest transmitted optical power is identified. The method then proceeds to step 460, where a new sphere with a radius smaller than the previous sphere is defined, with an origin located at the high power point identified in step 450. The method then returns to step 430 and the routine repeats. The radius of the new sphere is preferably at least half as larger as the radius of the previous sphere. However, the radius can be reduced by any amount while still falling within the scope of the present invention.

Figure 7:
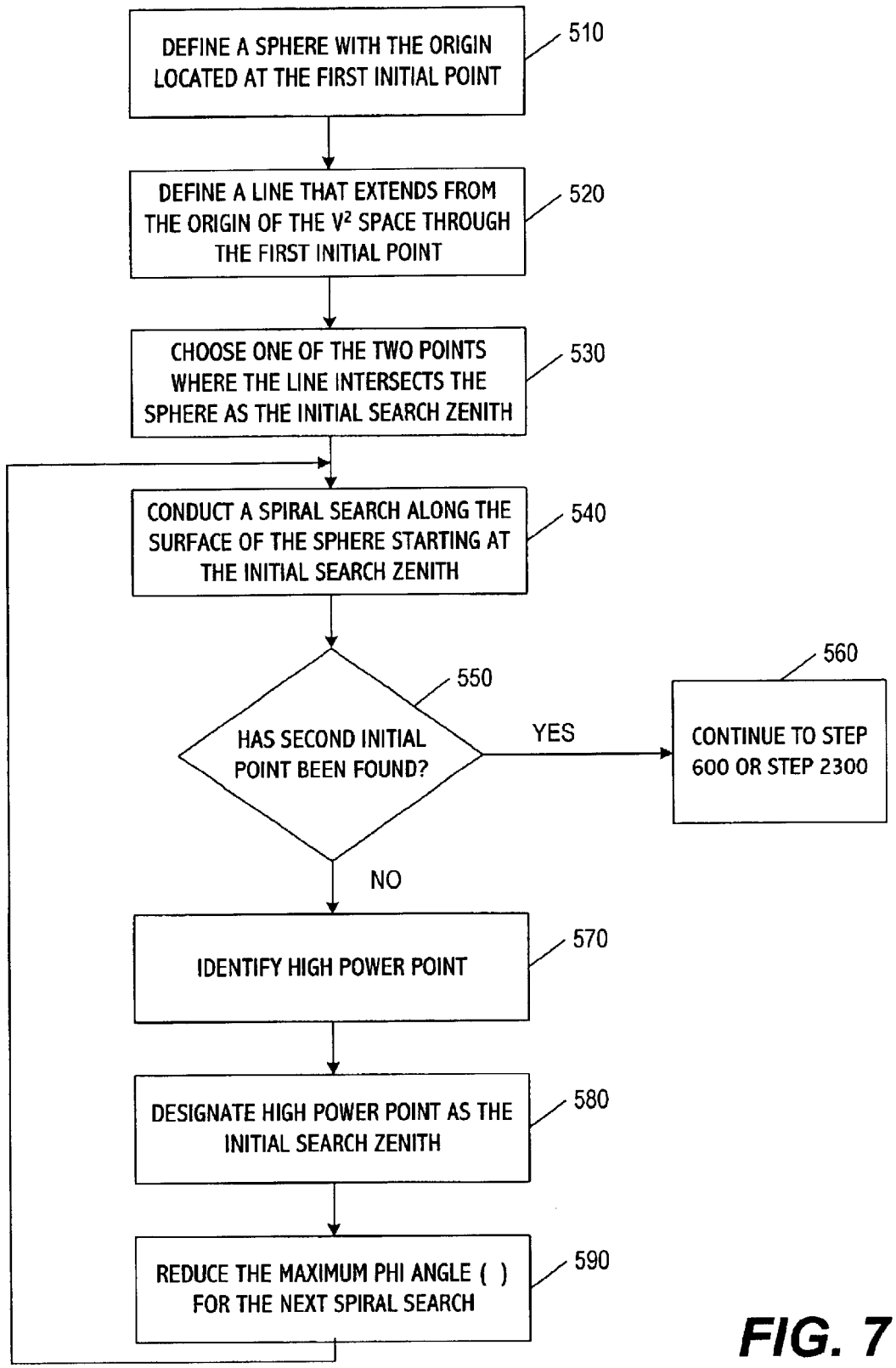
FIG. 7 is a flowchart of a preferred method for locating a Second Initial Point on an Operating Line, in accordance with the present invention.

FIG. 7 is a flowchart of a preferred method for locating the Second Initial Point on the Operating Line 200 (step 500 in FIG. 4A and step 2200 in FIG. 4B). The method starts at step 510, where a sphere is defined having an origin located at the First Initial Point determined at step 400 of FIG. 4A or step 2100 of FIG. 4B.

Next, at step 520, a line is defined that extends from the origin of the $V^2$ Space through the First Initial Point. This line intersects the sphere 1000 at two points that define two semi-spheres of the sphere 1000. Next, at step 530, one of the two points where the line defined in step 520 intersects the sphere 1000 is chosen as the initial search zenith, preferably the point that produces the highest transmitted power.

The method then proceeds to step 540, where a spiral search is conducted along the surface of the sphere starting at the initial search zenith. It is assumed that the Operating Line 200 goes from lower voltage to higher voltage along each axis. If this assumption can be made, only a portion of the sphere 1000 needs to be searched, because an Operating Line 200 with an increasing slope must intersect each semi-sphere of the sphere 1000 once. Accordingly, if this assumption can be made, the spiral search can be conducted over only a portion of the sphere 1000, preferably between ¼ of the sphere (φ is varied from 0 to π/4) and ½ of the sphere (φ is varied from 0 to π/2).

Next, at step 550, it is determined whether the Second Initial Point has been found. Similar to the method used for the First Initial Point, it is determined that the Second Initial Point has been found when the differences in the transmitted optical power at the different sampling points on the sphere 1000 can not be discerned above the inherent noise in the device. If the Second Initial Point has been found, the method continues to step 560, where control is returned to step 600 of FIG. 4A or step 2300 of FIG. 4B. Otherwise, the method continues to step 570.

At step 570, the point on the sphere that generates the highest transmitted optical power is identified and designated as the high power point. Next, at step 580, the high power point is designated as the initial search zenith for the next spherical search.

Then, at step 590, the maximum φ angle for the next spiral search as well as Δφ is reduced. Control then returns to step 540, where a new spiral search is conducted along the surface of the same sphere, starting at the initial search zenith and having a maximum size define by the φ angle.

Figure 8:
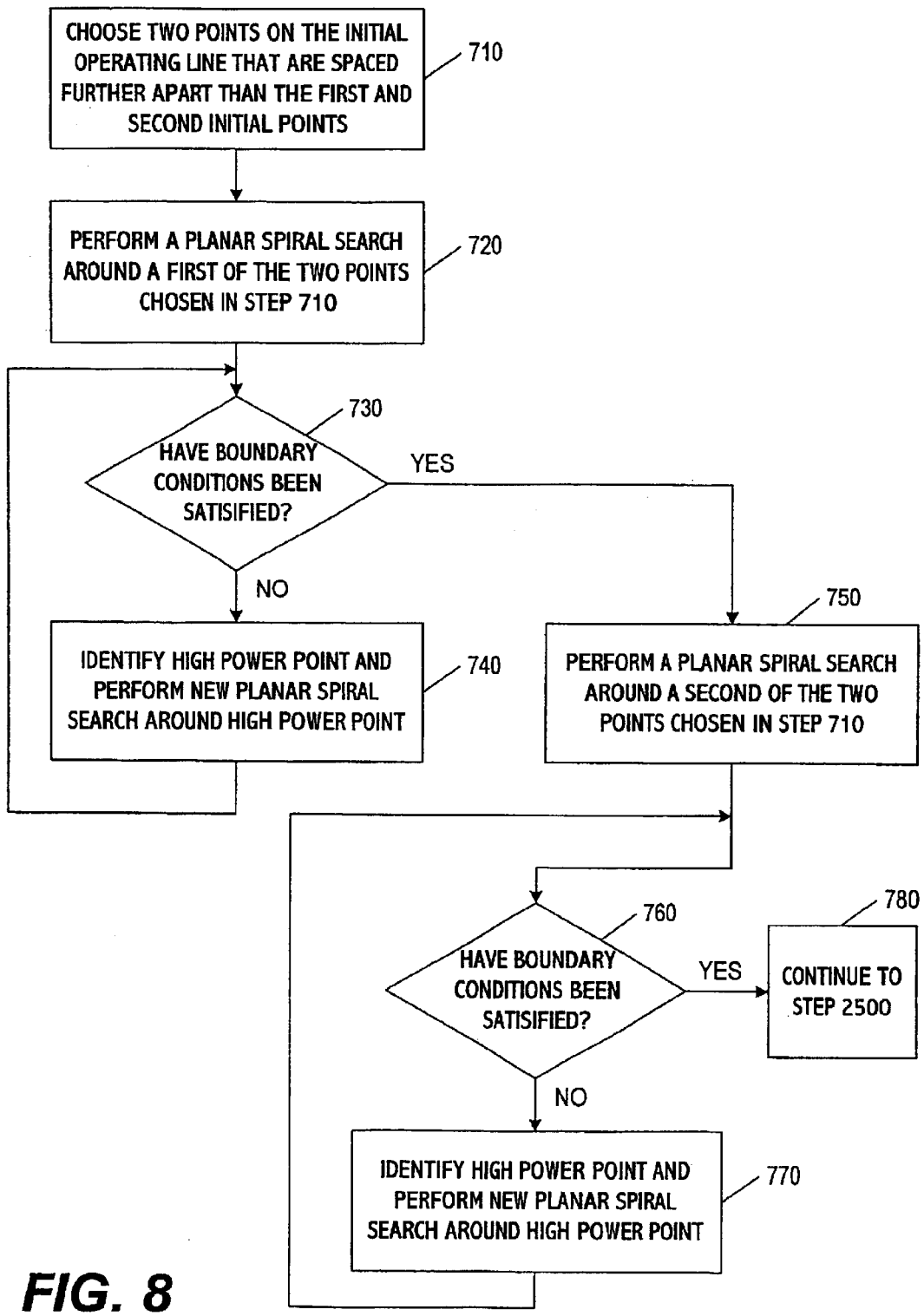
FIG. 8 is a flowchart of a preferred method for locating at least two additional points on a final Operating Line that are further apart than the First and Second Initial Points, in accordance with the present invention.

FIG. 8 is a flowchart of a preferred method for locating at least two additional points on the final Operating Line that are further apart than the First and Second Initial Points (step 2400 in FIG. 4B). Using points further apart on the Operating Line generally generate better accuracy of the Operating Line as an approximation of the Parallel Scan. The method starts at step 710, where two points on the Initial Operating Line that are spaced further apart than the First and Second Initial Points are chosen.

Next, at step 720, a planar spiral search is performed around a first of the two points chosen in step 710. The planar spiral search is performed along the plane perpendicular to the Initial Operating Line. The planar spiral search searches only in a plane in $V^2$ Space.

Next, at step 730, it is determined whether certain boundary conditions have been satisfied. Such boundary conditions determine whether no further search will be done. For example, in a preferred embodiment, it is determined whether differences in the transmitted optical power at each point along the planar spiral search are discernable over the inherent noise in the device. If the differences can-not be discerned, the boundary condition is satisfied, and the method proceeds to step 750. Otherwise, the method continues to step 740, where the high power point from the previous planar spiral search is identified, and a new planar spiral search around the high power point is performed. The method than returns to step 730, and the routine is repeated.

At step 750, a planar spiral search is performed around the second of the two points chosen in step 710. The planar spiral search is performed along the plane perpendicular to the Initial Operating Line. The planar spiral search searches only in a plane in $V^2$ Space.

Next, at step 760, it is determined whether certain boundary conditions have been satisfied. Specifically, it is determined whether differences in the transmitted optical power at each point along the planar spiral search are discernable over the inherent noise in the device. If the differences can not be discerned, the boundary condition is satisfied, and the method proceeds to step 780, where the method returns to step 2500 in FIG. 4B. Otherwise, the method continues to step 770, where the high power point from the previous planar spiral search is identified, and a new planar spiral search around the high power point is performed. The method then returns to step 760, and the routine is repeated.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

Specifically, although the present invention has been described in connection with finding an Operating Line 200 for a tunable Fabry-Perot filter with a three-electrode structure, it should be appreciated that the present invention can be generalized to an actuation mechanism having three degrees of freedom. Accordingly, the operating region that one would like to locate using the methods of the present invention may be nonlinear. For example, the operating region may be such that it can be approximated by a curve, such as a sinusoidal curve, a parabolic curve, etc.

The present invention can be used to find points along the operating region, regardless of the actual shape of the operating region. Those points, in turn, can then be used to approximate the rest of the operating region of interest. In the example described above, the operating region was approximated by a line, and the located points were used to solve for the slope of the line, which in turn allowed the rest of the line to be calculated. A similar technique can be used with nonlinear operating regions.

In addition, the tunable Fabry-Perot example used to describe the present invention utilizes electrostatic actuation. Accordingly, voltage was used as the units that defined the operating region of interest. It should be appreciated that the units used for defining the operating region of interest can be different, depending on the type of actuation mechanism being used. For example, a magnetic actuation mechanism could be used.

The present invention is more generally directed to a method of finding a three-dimensional operating region of interest using a two-dimensional search methodology. Accordingly, although the preferred methods described above for finding the points along the Operating Line 200 utilize a search methodology based on spherical coordinates, it should be appreciated that any other two-dimensional search methodology can be used to locate the points on the three-dimensional operating region of interest.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of adjusting a gap between two surfaces in a mechanical system, comprising the steps of:

applying three independently adjustable forces to at least one of the two surfaces; and adjusting a magnitude of each of the three independently adjustable forces so that a predetermined tilt relationship is substantially maintained between the two surfaces as the gap is adjusted.

2. The method of claim 1, wherein the three independently adjustable forces comprise electrostatic forces.

3. The method of claim 1, wherein each of the two surfaces is at least partially reflective.

4. The method of claim 3, wherein the two surfaces together define a resonant optical cavity.

5. The method of claim 1, wherein the three independently adjustable forces are applied to the at least one surface at three symmetrically placed locations on the at least one surface.

6. The method of claim 1, wherein the magnitude of each of the three independently adjustable forces is adjusted in accordance with a respective values in a look-up table.

7. The method of claim 1, wherein the three independently adjustable forces are adjusted so as to compensate for asymmetries in the mechanical system.

8. The method of claim 1, wherein at least one of the surfaces is suspended by a compliant member.

9. The method of claim 8, wherein the compliant member comprises an elastomer.

10. The method of claim 1, wherein the magnitude of each of the three independently adjustable forces is adjusted so that the two surfaces are maintained in a substantially parallel relationship as the gap is adjusted.

11. A method of finding an operating region for a system, wherein the operating region represents a set of values for three independently adjustable forces that optimizes a parameter of the system, the method comprising the steps of:

adjusting the values of each of the three independently adjustable forces in accordance with a first search method, while monitoring the system parameter;

locating a first initial point in the operating region based on the first search method;

adjusting the values of each of the three independently adjustable forces in accordance with a second search method, while monitoring the system parameter;

locating a second initial point in the operating region based on the second search method; and calculating the operating region based on the first and second initial points.

12. The method of claim 11, wherein the independently adjustable forces comprise electrostatic forces.

13. The method of claim 12, wherein the operating region comprises a set of voltage values.

14. The method of claim 11, wherein the operating region defines a line when the set of values are plotted in three-dimensional space.

15. The method of claim 14, wherein the operating region is calculated by calculating a slope of the line based on the first and second initial points.

16. The method of claim 11, wherein the first search method comprises the steps of:

(1) mapping each independently adjustable force as an axis in three-dimensional space;

(2) defining a sphere with an origin located within the three-dimensional space, wherein each point on the surface of the sphere represents three independent values for the three independently adjustable forces, respectively;

(3) conducting a first initial point search along the surface of the sphere while monitoring the system parameter;

(4) determining if the first initial point has been located based on system parameter values obtained during the search; and (5) repeating steps (1)–(4) using a new sphere with a new origin if the first initial point has not been located, wherein the new origin is determined based on the system parameter values obtained during the search.

17. The method of claim 16, wherein the second search method comprises the steps of:

(1) defining a sphere with an origin located at the first initial point, wherein each point on the surface of the sphere represents three independent values for the three independently adjustable forces, respectively;

(2) defining a line that intersects an origin of the three-dimensional space and the first initial point;

(3) designating a point on the sphere intersected by the line as a search zenith;

(4) conducting a second initial point search along the surface of the sphere starting at the search zenith while monitoring the system parameter;

(5) determining if the second initial point has been located based on system parameter values obtained during the search; and (6) repeating steps (1)–(4) using a new search zenith if the second initial point has not been located, wherein the new search zenith is determined based on the based on the system parameter values obtained during the search.

18. The method of claim 17, wherein the first and second initial point searches each comprise a spiral search.

19. A method of finding an operating region for a tunable Fabry-Perot cavity, wherein the operating region represents a set of drive values for driving three independently adjustable actuators such that the cavity mirrors of the tunable Fabry-Perot cavity are maintained in a substantially parallel relationship, the method comprising the steps of:

monitoring an optical signal transmitted or reflected by the tunable Fabry-Perot cavity;

driving each of the three independently adjustable actuators with a plurality of drive values in accordance with a first search method, while monitoring the transmitted or reflected optical signal;

locating a first initial point in the operating region based on the first search method;

driving each of the three independently adjustable actuators with a plurality of drive values in accordance with a second search method, while monitoring the transmitted or reflected optical signal;

locating a second initial point in the operating region based on the second search method; and calculating the operating region based on the first and second initial points.

20. The method of claim 19, wherein the independently adjustable actuators comprise electrostatic actuators.

21. The method of claim 20, wherein the operating region comprises a set of voltage values.

22. The method of claim 19, wherein the operating region defines a line when the set of values are plotted in three-dimensional space.

23. The method of claim 22, wherein the operating region is calculated by calculating a slope of the line based on the first and second initial points.

24. The method of claim 19, wherein the first search method comprises the steps of:

(1) mapping drive values applied to each independently adjustable actuator as a respective axis in three-dimensional space;

(2) defining a sphere with an origin located within the three-dimensional space, wherein each point on the surface of the sphere represents three independent drive values for the three independently adjustable actuators, respectively;

(3) conducting a first initial point search along the surface of the sphere while monitoring a magnitude of the transmitted or reflected optical signal;

(4) determining if the first initial point has been located based on how the magnitude of the transmitted or reflected optical signal varied during the search; and (5) repeating steps (1)–(4) using a new sphere with a new origin if the first initial point has not been located, wherein the new origin is determined based on how the magnitude of the transmitted or reflected optical signal varied during the search.

25. The method of claim 24, wherein the second search method comprises the steps of:

(1) defining a sphere with an origin located at the first initial point, wherein each point on the surface of the sphere represents three independent drive values for the three independently adjustable actuators, respectively;

(2) defining a line that intersects an origin of the three-dimensional space and the first initial point;

(3) designating a point on the sphere intersected by the line as a search zenith;

(4) conducting a second initial point search along the surface of the sphere starting at the search zenith while monitoring a magnitude of the transmitted or reflected optical signal;

(5) determining if the second initial point has been located based on how the magnitude of the transmitted or reflected optical signal varied during the search; and (6) repeating steps (1)–(4) using a new search zenith if the second initial point has not been located, wherein the new search zenith is determined based on how the magnitude of the transmitted or reflected optical signal varied during the search.

26. The method of claim 25, wherein the first and second initial point searches each comprise a spiral search.

27. A method of finding an operating region for a tunable Fabry-Perot cavity, wherein the operating region represents a set of drive values for driving three independently adjustable actuators, comprising:

using at least three points of known drive values and output wavelength to solve a second-order polynomial function to calibrate driving values; and using the solution to the second-order polynomial function to calibrate driving values to peak output wavelengths.

* * * * *